United States Patent
Burgan et al.

(10) Patent No.: US 8,665,779 B2
(45) Date of Patent: *Mar. 4, 2014

(54) MONITORING AND CONTROL OF TRANSMIT POWER IN A MULTI-MODEM WIRELESS COMMUNICATION DEVICE

(75) Inventors: John M. Burgan, North Palm Beach, FL (US); Jose E. Korneluk, Lake Worth, FL (US); Michael J. Rudowicz, Boynton Beach, FL (US)

(73) Assignee: Motorola Mobility LLC, Libertyville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/621,130

(22) Filed: Sep. 15, 2012

(65) Prior Publication Data
US 2013/0012258 A1  Jan. 10, 2013

Related U.S. Application Data

(63) Continuation of application No. 11/686,426, filed on Mar. 15, 2007.

(60) Provisional application No. 60/867,853, filed on Nov. 30, 2006.

(51) Int. Cl.
*H04B 7/185* (2006.01)
*H04B 1/38* (2006.01)
*H04M 1/00* (2006.01)

(52) U.S. Cl.
USPC .......... 370/318; 455/553.1; 455/574

(58) Field of Classification Search
USPC .......... 370/310.2, 318, 328, 338, 351–356; 455/418, 419, 422.1, 13.4, 550.1, 455/552.1, 553.1, 556.1, 556.2, 571–574, 455/127.1–127.5, 343.1–343.6
See application file for complete search history.

(56) References Cited

U.S. PATENT DOCUMENTS

| | | | |
|---|---|---|---|
| 3,846,694 A * | 11/1974 | Archer | 363/96 |
| 3,852,669 A | 12/1974 | Bowman et al. | |
| 4,353,037 A | 10/1982 | Miller | |
| 4,523,327 A | 6/1985 | Eversole | |
| 5,043,672 A | 8/1991 | Youn | |
| 5,204,643 A | 4/1993 | Verronen | |
| 5,235,188 A | 8/1993 | Mul | |

(Continued)

FOREIGN PATENT DOCUMENTS

| WO | 0180445 A1 | 10/2001 |
|---|---|---|
| WO | 2005084057 A1 | 9/2005 |

OTHER PUBLICATIONS

Young, Declaration of Prior Art Reference, Feb. 6, 2007, 2 pgs.

(Continued)

*Primary Examiner* — San Htun

(57) ABSTRACT

A method (100) for limiting transmission power of a communication device (600) having a plurality of transceivers (610, 615). The method can include determining a desired maximum transmission power and determining a plurality of power contribution factors. Each of the power contribution factors can be associated with a respective one of the transceivers. The method also can include determining an expected transmission power based on, at least in part, a sum of the power contribution factors. Further, responsive to the expected transmission power exceeding the desired maximum transmission power, the power contribution for at least one of the transceivers can be selectively reduced or terminated.

13 Claims, 5 Drawing Sheets

(56) References Cited

U.S. PATENT DOCUMENTS

| | | | |
|---|---|---|---|
| 5,468,684 A | 11/1995 | Yoshimori et al. | |
| 5,524,275 A | 6/1996 | Lindell | |
| 5,570,408 A | 10/1996 | Gibson | |
| 5,682,404 A | 10/1997 | Miller | |
| 5,884,149 A | 3/1999 | Jaakola | |
| 5,946,619 A | 8/1999 | Kolev | |
| 5,995,041 A | 11/1999 | Bradley et al. | |
| 6,064,857 A | 5/2000 | Wiedeman et al. | |
| 6,067,449 A | 5/2000 | Jager | |
| 6,141,706 A | 10/2000 | Thornton et al. | |
| 6,151,509 A | 11/2000 | Chorey | |
| 6,192,230 B1 | 2/2001 | van Bokhorst et al. | |
| 6,236,042 B1 | 5/2001 | Kato et al. | |
| 6,249,566 B1 | 6/2001 | Hayashi et al. | |
| 6,304,748 B1 | 10/2001 | Li et al. | |
| 6,493,421 B2 | 12/2002 | Gutman | |
| 6,549,625 B1 | 4/2003 | Rautila et al. | |
| 6,580,940 B2 | 6/2003 | Gutman | |
| 6,668,175 B1 | 12/2003 | Almgren et al. | |
| 6,697,953 B1 | 2/2004 | Collins | |
| 6,710,651 B2 | 3/2004 | Forrester | |
| 6,744,743 B2 | 6/2004 | Walton et al. | |
| 6,744,813 B1 | 6/2004 | Ko et al. | |
| 6,744,850 B2 | 6/2004 | Fanton et al. | |
| 6,760,311 B1* | 7/2004 | Raith | 370/252 |
| 6,823,042 B2 | 11/2004 | Hayashi et al. | |
| 6,845,246 B1 | 1/2005 | Steer | |
| 6,909,708 B1 | 6/2005 | Krishnaswamy et al. | |
| 6,960,956 B2 | 11/2005 | Pehlke et al. | |
| 6,985,113 B2 | 1/2006 | Nishimura et al. | |
| 6,987,986 B2 | 1/2006 | Boesen | |
| 7,069,043 B2 | 6/2006 | Sawamura et al. | |
| 7,133,419 B1 | 11/2006 | Hendrichs et al. | |
| 7,134,029 B2 | 11/2006 | Hepner et al. | |
| 7,148,748 B2 | 12/2006 | Apel | |
| 7,187,663 B2 | 3/2007 | Schmidt | |
| 7,221,955 B2 | 5/2007 | Chen et al. | |
| 7,280,505 B2 | 10/2007 | Chaskar et al. | |
| 7,298,822 B2 | 11/2007 | Dietsch et al. | |
| 7,366,142 B2 | 4/2008 | Ngai et al. | |
| 7,486,975 B2 | 2/2009 | Mori | |
| 7,525,261 B2 | 4/2009 | van Zundert et al. | |
| 7,627,296 B2 | 12/2009 | Kezys et al. | |
| 7,633,898 B2 | 12/2009 | Jain et al. | |
| 8,054,826 B2 | 11/2011 | Cheng et al. | |
| 8,059,702 B2 | 11/2011 | Young et al. | |
| 8,170,604 B2 | 5/2012 | Uehara et al. | |
| 2002/0016155 A1 | 2/2002 | Charbonnier | |
| 2002/0101907 A1 | 8/2002 | Dent et al. | |
| 2002/0142791 A1 | 10/2002 | Chen et al. | |
| 2003/0078037 A1 | 4/2003 | Auckland et al. | |
| 2003/0123425 A1 | 7/2003 | Walton et al. | |
| 2003/0149904 A1 | 8/2003 | Kim | |
| 2003/0157954 A1 | 8/2003 | Medvedev et al. | |
| 2003/0208601 A1 | 11/2003 | Campbell et al. | |
| 2003/0228875 A1 | 12/2003 | Alapuranen | |
| 2004/0082295 A1* | 4/2004 | Ngai et al. | 455/13.4 |
| 2004/0108895 A1 | 6/2004 | Wu et al. | |
| 2004/0121799 A1 | 6/2004 | Chiou | |
| 2004/0142715 A1 | 7/2004 | Oses | |
| 2004/0174833 A1 | 9/2004 | Raith | |
| 2004/0176125 A1 | 9/2004 | Lee | |
| 2004/0204181 A1 | 10/2004 | Cromer et al. | |
| 2004/0235438 A1* | 11/2004 | Quilisch et al. | 455/127.2 |
| 2005/0075123 A1 | 4/2005 | Jin et al. | |
| 2005/0135312 A1 | 6/2005 | Montojo et al. | |
| 2005/0195787 A1 | 9/2005 | Madour et al. | |
| 2005/0201321 A1 | 9/2005 | Sinnarajah et al. | |
| 2005/0215206 A1 | 9/2005 | Granstrom et al. | |
| 2005/0240756 A1 | 10/2005 | Mayer | |
| 2005/0240786 A1* | 10/2005 | Ranganathan | 713/320 |
| 2005/0242879 A1 | 11/2005 | Muller | |
| 2005/0272382 A1 | 12/2005 | Amano | |
| 2005/0282579 A1 | 12/2005 | Kim | |
| 2006/0003793 A1* | 1/2006 | Ngai et al. | 455/522 |
| 2006/0067245 A1 | 3/2006 | Pearl | |
| 2006/0084395 A1 | 4/2006 | Kezys et al. | |
| 2006/0194540 A1 | 8/2006 | Hunzinger et al. | |
| 2006/0223577 A1 | 10/2006 | Ouzillou | |
| 2006/0229029 A1 | 10/2006 | Waltho et al. | |
| 2006/0293074 A1* | 12/2006 | Bottomley et al. | 455/522 |
| 2007/0014260 A1 | 1/2007 | Seo | |
| 2007/0030063 A1 | 2/2007 | Izumi et al. | |
| 2007/0042775 A1 | 2/2007 | Umatt et al. | |
| 2007/0049239 A1 | 3/2007 | Joung et al. | |
| 2007/0111681 A1 | 5/2007 | Alberth et al. | |
| 2007/0135154 A1 | 6/2007 | Gautier et al. | |
| 2007/0146210 A1 | 6/2007 | Hilgers | |
| 2007/0285247 A1 | 12/2007 | Forster | |
| 2007/0298835 A1 | 12/2007 | Uehara et al. | |
| 2008/0053207 A1 | 3/2008 | Burgan et al. | |
| 2008/0062912 A1 | 3/2008 | Tiedemann, Jr. et al. | |
| 2008/0102874 A1 | 5/2008 | Gautier et al. | |
| 2008/0118014 A1 | 5/2008 | Reunamaki et al. | |
| 2008/0130727 A1 | 6/2008 | Young et al. | |
| 2008/0130728 A1 | 6/2008 | Burgan et al. | |
| 2008/0146268 A1 | 6/2008 | Gandhi et al. | |
| 2009/0296794 A1 | 12/2009 | Min et al. | |
| 2012/0231737 A1 | 9/2012 | Ponce De Leon et al. | |

OTHER PUBLICATIONS

United States Patent & Trademark Office, "Non-Final Rejection" for U.S. Appl. No. 11/610,592, Feb. 24, 2010, 12 pgs.

United States Patent & Trademark Office, "Non-Final Rejection" for U.S. Appl. No. 11/467,949, Sep. 3, 2009, 15 pgs.

United States Patent & Trademark Office, "Non-Final Rejection" for U.S. Appl. No. 11/553,999, Jul. 9, 2009, 16 pgs.

United States Patent & Trademark Office, "Final Rejection" for U.S. Appl. No. 11/553,999, Mar. 29, 2010, 18 pgs.

United States Patent & Trademark Office, "Non-Final Rejection" for U.S. Appl. No. 11/686,351, Jul. 28, 2010, 15 pgs.

United States Patent & Trademark Office, "Non-Final Rejection" for U.S. Appl. No. 11/686,351, Jan. 14, 2011, 17 pgs.

United States Patent & Trademark Office, "Non-Final Rejection" for U.S. Appl. No. 11/686,351, Feb. 26, 2010, 15 pgs.

United States Patent & Trademark Office, "Notice of Allowance" for U.S. Appl. No. 11/686,351, May 31, 2011, 9 pgs.

United States Patent & Trademark Office, "Non-Final Rejection" for U.S. Appl. No. 11/426,710, Jun. 10, 2011, 51 pgs.

United States Patent & Trademark Office, "Non-Final Rejection" for U.S. Appl. No. 11/273,231, Feb. 16, 2011, 27 pgs.

Korean Intellectual Property Office, "Preliminary Rejection" for Application No. 10-2009-7013480 received Apr. 27, 2011, 5 pgs.

WIPO International Searching Authority, International Search Report and Written Opinion, International Application No. PCT/US2007/084906, Jul. 16, 2008.

United States Patent & Trademark Office, "Non-Final Rejection" for U.S. Appl. No. 11/610,592, Oct. 14, 2011, 22 pgs.

European Patent Office "Examination Report Under EPC Art. 94(3)" for Patent Application No. 07864502.5-1852, Jul. 11, 2013, 8 pages.

United States Patent and Trademark Office, "Non-Final Office Action" for U.S. Appl. No. 11/686,426 Jan. 25, 2010, 18 pg.

United States Patent and Trademark Office, "Final Office Action" for U.S. Appl. No. 11/686,426, Aug. 2, 2010, 22 pg.

United States Patent and Trademark Office, "Non-Final Office Action" for U.S. Appl. No. 11/686,426, Jan. 6, 2012, 32 pg.

United States Patent and Trademark Office, "Notice of Allowance" for U.S. Appl. No. 11/426,710, Dec. 20, 2011, 7 pg.

United States Patent and Trademark Office, "Non-Final Office Action" for U.S. Appl. No. 11/426,710, Dec. 27, 2010, 8 pg.

United States Patent and Trademark Office, "Non-Final Office Action" for U.S. Appl. No. 11/426,710, Jul. 20, 2010, 8 pg.

United States Patent and Trademark Office, "Non-Final Office Action" for U.S. Appl. No. 11/426,710, Sep. 3, 2009, 9 pg.

United States Patent and Trademark Office, "Non-Final Office Action" for U.S. Appl. No. 11/426,710, Mar. 3, 2009, 8 pg.

United States Patent and Trademark Office, "Notice of Allowance" for U.S. Appl. No. 11/610,592, Sep. 1, 2010, 6 pg.

(56) References Cited

OTHER PUBLICATIONS

United States Patent and Trademark Office, "Notice of Allowance" for U.S. Appl. No. 11/610,592, Dec. 20, 2010, 7 pg.
United States Patent and Trademark Office, "Notice of Allowance" for U.S. Appl. No. 11/610,592, Apr. 6, 2011, 8 pg.
United States Patent and Trademark Office, "Notice of Allowance" for U.S. Appl. No. 11/610,592, Aug. 16, 2011, 8 pg.
United States Patent and Trademark Office, "Notice of Allowance" for U.S. Appl. No. 11/610,592, Sep. 7, 2012, 7 pg.
United States Patent and Trademark Office, "Notice of Allowance" for U.S. Appl. No. 11/610,592, Jan. 24, 2013, 8 pg.
United States Patent and Trademark Office, "Notice of Allowance" for U.S. Appl. No. 11/610,592, Jun. 10, 2013, 9 pg.
United States Patent and Trademark Office, "Notice of Allowance" for U.S. Appl. No. 11/686,351, Aug. 31, 2011, 5 pg.
United States Patent and Trademark Office, "Non-Final Office Action" for U.S. Appl. No. 11/273,231, Oct. 11, 2012, 18 pg.
United States Patent and Trademark Office, "Non-Final Office Action" for U.S. Appl. No. 11/273,231, Jul. 11, 2011, 18 pg.
United States Patent and Trademark Office, "Non-Final Office Action" for U.S. Appl. No. 11/273,231, Aug. 19, 2010, 13 pg.
United States Patent and Trademark Office, "Non-Final Office Action" for U.S. Appl. No. 11/273,231, Apr. 1, 2009, 12 pg.
United States Patent and Trademark Office, "Non-Final Office Action" for U.S. Appl. No. 11/273,231, Oct. 2, 2008, 14 pg.
United States Patent and Trademark Office, "Final Office Action" for U.S. Appl. No. 11/273,231, Nov. 2, 2009, 21 pg.
United States Patent and Trademark Office, "Final Office Action" for U.S. Appl. No. 11/273,231, Dec. 19, 2011, 23 pg.
United States Patent and Trademark Office, "Final Office Action" for U.S. Appl. No. 11/273,231, Jul. 19, 2013, 21 pg.
United States Patent and Trademark Office, "Notice of Allowance" for U.S. Appl. No. 11/686,426, Jul. 20, 2012, 16 pg.
United States Patent and Trademark Office, "Notice of Allowance" for U.S. Appl. No. 11/686,426, Nov. 9, 2012, 17 pg.
United States Patent and Trademark Office, "Notice of Allowance" for U.S. Appl. No. 11/686,426, Mar. 4, 2013, 17 pg.
United States Patent and Trademark Office, "Notice of Allowance" for U.S. Appl. No. 11/686,426, Jun. 24, 2013, 18 pg.
United States Patent and Trademark Office, "Notice of Allowance" for U.S. Appl. No. 11/610,592, Oct. 8, 2013, 10 pg.

* cited by examiner

MONITORING AND CONTROL OF TRANSMIT POWER IN A MULTI-MODEM WIRELESS COMMUNICATION DEVICE

CROSS REFERENCES TO RELATED APPLICATIONS

This application claims benefit of U.S. nonprovisional patent application Ser. No. 11/686,426, filed Mar. 15, 2007, and U.S. provisional patent application No. 60/867,853, filed Nov. 30, 2006, which are herein incorporated by reference.

BACKGROUND OF THE INVENTION

1. Field of the Invention

The present invention generally relates to mobile communication devices and, more particularly, to such devices which include a plurality of wireless transceivers.

2. Background of the Invention

The use of mobile stations has grown to an extent that such devices are now ubiquitous throughout most of the industrialized world. Just as their use has grown, so too has the functionality of mobile stations. Indeed, mobile stations now can be used not only for voice communications, but also to perform a number of other tasks. For example, mobile stations can be used to take photographs, capture and stream video, browse the Internet, play games, and send and receive instant messages and e-mail. Moreover, mobile stations can simultaneously perform a plurality of such functions. For example, while a user is engaged in a telephone conversation on a mobile station, the user also can send and receive data in multiple formats. For instance, the user can browse the Internet, communicate data files and communicate via e-mail.

Unfortunately, to maintain a telephone call while simultaneously communicating data can be extremely taxing on a mobile station's transceivers due to increased data transmission rates and longer duty cycles that are required of the transceivers. The increased data transmission rates and longer duty cycles generally result in generation of a significant amount of thermal energy (i.e. heat) by the transceivers and rapid depletion of battery resources.

SUMMARY OF THE INVENTION

The present invention relates to a method for limiting transmission power of a communication device having a plurality of transceivers. The method can include determining a desired maximum transmission power and determining a plurality of power contribution factors. Each of the power contribution factors can be associated with a respective one of the transceivers. The method also can include determining an expected transmission power based on, at least in part, a sum of the power contribution factors. Further, responsive to the expected transmission power exceeding the desired maximum transmission power, the power contribution for at least one of the transceivers can be selectively reduced or terminated. Selectively reducing the power contribution can include reducing a bit rate of a data stream for the at least one of the transceivers and/or reducing a duty cycle of a data stream for the at least one of the transceivers. Selectively terminating the power contribution also can include halting communication on at least one of the transceivers.

Further, selectively reducing or terminating the power contribution for at least one of the transceivers can include prioritizing each of a plurality of services active on the communication device and reducing the power contribution for at least one of the services having a low priority. Prioritizing the services can include determining a quality of service class associated with each of the services. Reducing the power contribution for at least one of the services having a low priority can include reducing a bit rate of a service data stream for the service and/or reducing a duty cycle of a service data stream for the service. Selectively reducing or terminating the power contribution for at least one of the transceivers can include reallocating a service currently active on the transceiver to a second of the transceivers. In addition, the method can include receiving a request for an increase in instantaneous transmit power of a service data stream being transmitted by a first of the transceivers, reducing the bit rate of a service data stream being transmitted by a second of the transceivers, and increasing the energy per bit of the service data stream being transmitted by the first transceiver.

The present invention also relates to a communication device that includes a plurality of transceivers and a controller. The controller can determine a desired maximum transmission power and determine a plurality of power contribution factors, each of the power contribution factors associated with a respective one of the transceivers. The controller also can determine an expected transmission power based on, at least in part, a sum of the power contribution factors and, responsive to the expected transmission power exceeding the desired maximum transmission power, selectively reduce or terminate the power contribution for at least one of the transceivers.

Further, the controller can selectively reduce a bit rate of and/or a duty cycle of a data stream for the at least one of the transceivers in order to selectively reduce the power contribution. The controller also can prioritize each of a plurality of services active on the communication device and reduce the power contribution for at least one of the services having a low priority. The controller can prioritize the services by determining a quality of service class associated with each of the services. The controller also can reduce a bit rate and/or a duty cycle of a service data stream for the service. The controller also can reallocate a service currently active on the transceiver to a second of the transceivers. Moreover, the controller can receive a request for an increase in instantaneous transmit power of a service data stream being transmitted by a first of the transceivers, reduce the bit rate of a service data stream being transmitted by a second of the transceivers, and increase the energy per bit of the service data stream being transmitted by the first transceiver.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method for monitoring and controlling transmission power of a communication device having a plurality of transceivers, thereby reducing heat generation and instantaneous current draw from the communication device's battery, and limiting the total amount of RF energy simultaneously generated by the transceivers. The transmission power can be limited by prioritizing services active on the communication device, and reducing or terminating the power contribution of lower priority services. Accordingly, high priority services can remain unaffected by the reduction in transmission power. The active services can be prioritized based on, for example, their respective quality of service classes.

Figures 1, 2:
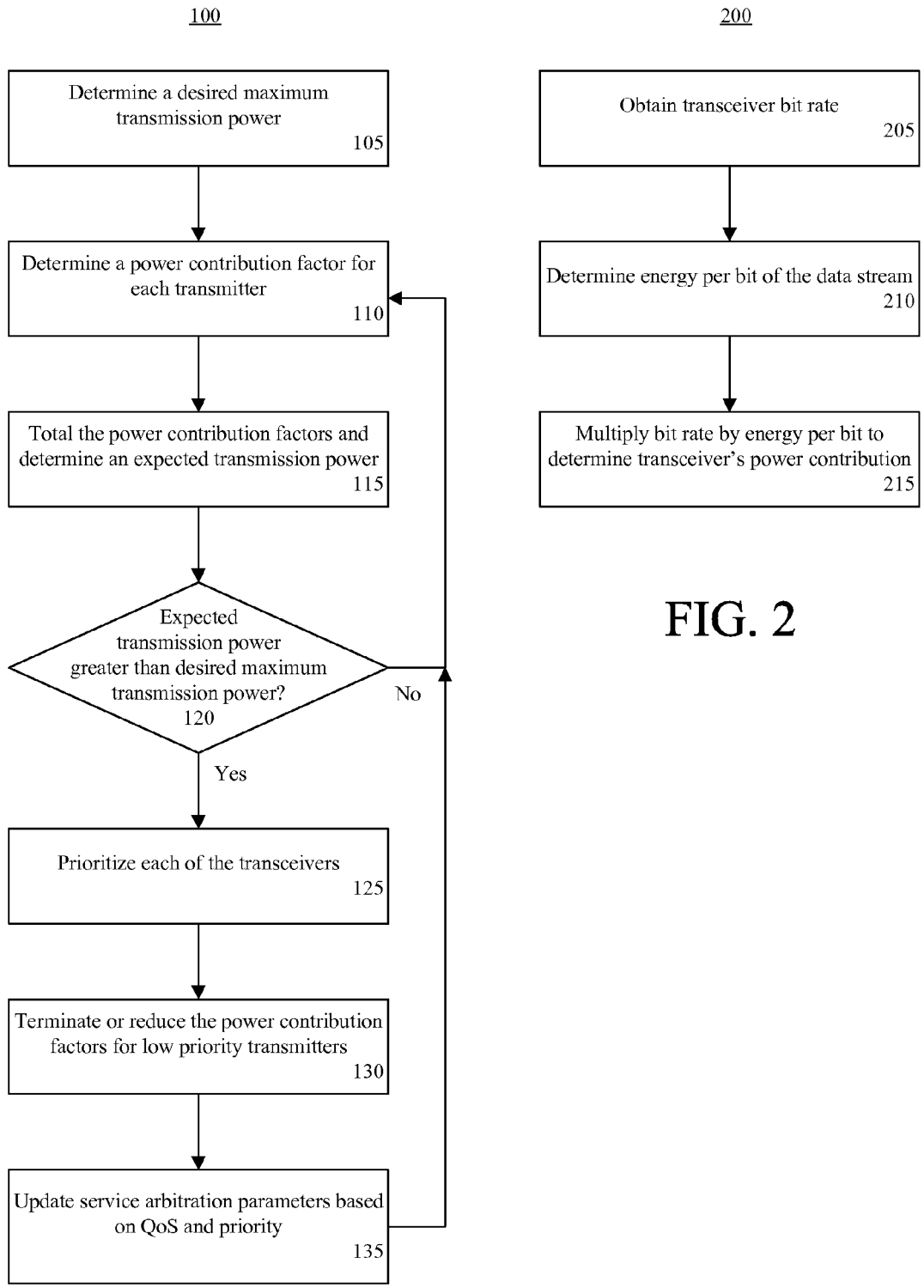
FIG. 1 is a flowchart presenting a method for reducing a communication device's transmit power that is useful for understanding the present invention.
FIG. 2 is a flowchart presenting a method for determining a transceivers power contribution that is useful for understanding the present invention.

FIG. 1 is a flowchart presenting a method 100 for reducing a communication device's transmission power. As used herein, the term "transmission power" is an average value of transmit power. The average value can be determined over any suitable period, for instance 100 mS, 1 S, 10 S, 1 min., 10 min., 30 min., etc. As used herein, the term "transmit power" is a value of the energy used to transmit a unit of data. The unit of data can include a single bit or a plurality of bits, although the unit should be short enough for a plurality of units to be averaged when determining the transmission power over a suitable period.

Beginning at step 105, a desired maximum transmission power for a communication device can be determined. The desired maximum transmission power can be determined based on any desired characteristics or parameters of the communication device, or any desired characteristics or parameters of systems, objects or entities affected by the communication device's transmissions. Further, determination of the desired maximum transmission power can be performed periodically, or the process can continually monitor the communication device to update the value of the desired maximum transmission power each time a change is detected in the communication device.

For example, the desired transmission power for the communication device can be determined based on a maximum desired temperature for one or more components of the communication device. The temperature of such components generally can be estimated by determining a temperature rise attributed to power losses in the communication device, including losses due to operation of a transceiver, and adding the temperature rise to an ambient temperature of the environment in which the communication device is operating. If the communication device is operated in a low temperature environment, a much greater temperature rise can be tolerated as opposed to operation in a high temperature environment.

By way of example, if the desired maximum temperature for a component, such as a shell of the communication device, is 45° C. and the ambient temperature is 15° C., a temperature rise of 30° C. can be allowed while still preventing the component from exceeding the desired maximum temperature. On the other hand, if the ambient temperature is 35° C., only a 10° C. temperature rise would be allowed. Thus, the desired transmission power for the communication device may vary depending on the circumstances in which the communication device is used, and can change as such circumstances change. Notwithstanding, the temperature of the communication device components typically will not change suddenly with a sudden change of ambient temperature. Accordingly, the temperature of the components can be monitored and transmission power adjustments can be implemented after one or more measured temperatures approach the desired maximum temperature.

Moreover, in addition to, or in lieu of, maximum operating temperature, other parameters can be used to determine the desired transmission power for the communication device. For example, the desired transmission power can be determined based on the level of charge left in the communication device's battery. In another arrangement, effects of RF energy transmitted by the communication device can be considered. For instance, a level of interaction with other electrical systems (i.e. electromagnetic interference), objects or entities can be considered. Such interaction is usually inversely related to the distance between the communication device and such systems, objects or entities. Accordingly, such distances also can be considered when determining the maximum transmission power.

Proceeding to step 110, transceivers active on the communication device can be identified and a power contribution factor for each of the identified transceivers can be determined. Such identification can be performed on a periodic basis, in response to a new service being requested on the communication device, or in response to a request for an increase in instantaneous transmit power of a first of the transceivers. The request for an increase in instantaneous transmit power can be received, for example, from a base transceiver station supporting a call session involving the communication device. Further, external devices to which the communication device is communicatively linked and which generate RF energy can be identified. Such objects also may have a level of interaction with other systems, objects or entities. Accordingly, the power contribution factor of such devices also can be determined.

At step 115, the power contribution factors for the transceivers active on the communication device can be summed, or totaled, and an expected transmission power can be determined. In an arrangement in which external devices are used, the power contribution factor of such devices can be added to the active transceiver power contribution factors to determine the expected transmission power.

Referring to decision box 120, if the expected transmission power is not greater than the desired maximum transmission power, the process can return to step 110 or, alternatively, step 105 and the process can continue. If, however, the expected transmission power is greater than the desired maximum transmission power, the process can proceed to step 125 and each of the active transceivers can be prioritized. The transceiver prioritization can be performed in any suitable manner.

For example, each transceiver can be prioritized in accordance with a ranking of its highest priority service. The priority of the services can be determined by QoS classes to which the services are assigned or priority levels are assigned to the services. In general, transceivers supporting voice calls can be given high priority.

Proceeding to step 130, one or more of the transceivers having the lowest priority (or priorities) can be deactivated and/or power contribution factors for such transceivers can be reduced. In one arrangement, to reduce the power contribution factor of a particular transceiver, the bit rate of one or more of its data streams can be reduced. For example, the communication device can negotiate a bit rate or modulation change with a scheduler, such as a base transceiver station. Alternatively, the communication device can terminate the communication session on the transceiver and request a new communication be established using a lower bit rate.

In another arrangement, the duty cycle of one or more of its data streams can be reduced. In yet another arrangement, the transmit energy for each bit in one or more of its data streams can be reduced. It should be noted, however, that reducing the transmit energy too much may result in an increase in data loss during transmission. If the data loss exceeds an acceptable value, it may be beneficial to increase the transmit energy per bit and lower the bit rate, or terminate one or more services active on the transceiver and automatically reinitiate the services at a later time.

At step 135, service arbitration parameters based on QoS (if applicable) and priority can be updated, for instance to activate and/or document changes to the data streams. The process then can return to step 110 or, alternatively, step 105 and the process can continue.

FIG. 2 is a flowchart presenting a method 200 for determining a particular transceiver's power contribution. Beginning at step 205, a transceiver bit rate can be obtained, for example by querying the transceiver. At step 210, the energy per bit of the transceiver's data stream can be determined. In one arrangement, such determination can be based on the protocol and modulation scheme that are used to transmit the data stream, and the instantaneous transmit power used to transmit the data stream. The instantaneous transmit power can be specified by a network with which the communication device communicates, for example, by a base transceiver station with which the communication device is communicating. At step 215, the transceiver's power contribution can be determined by multiplying the bit rate by the energy per bit.

Figure 3:
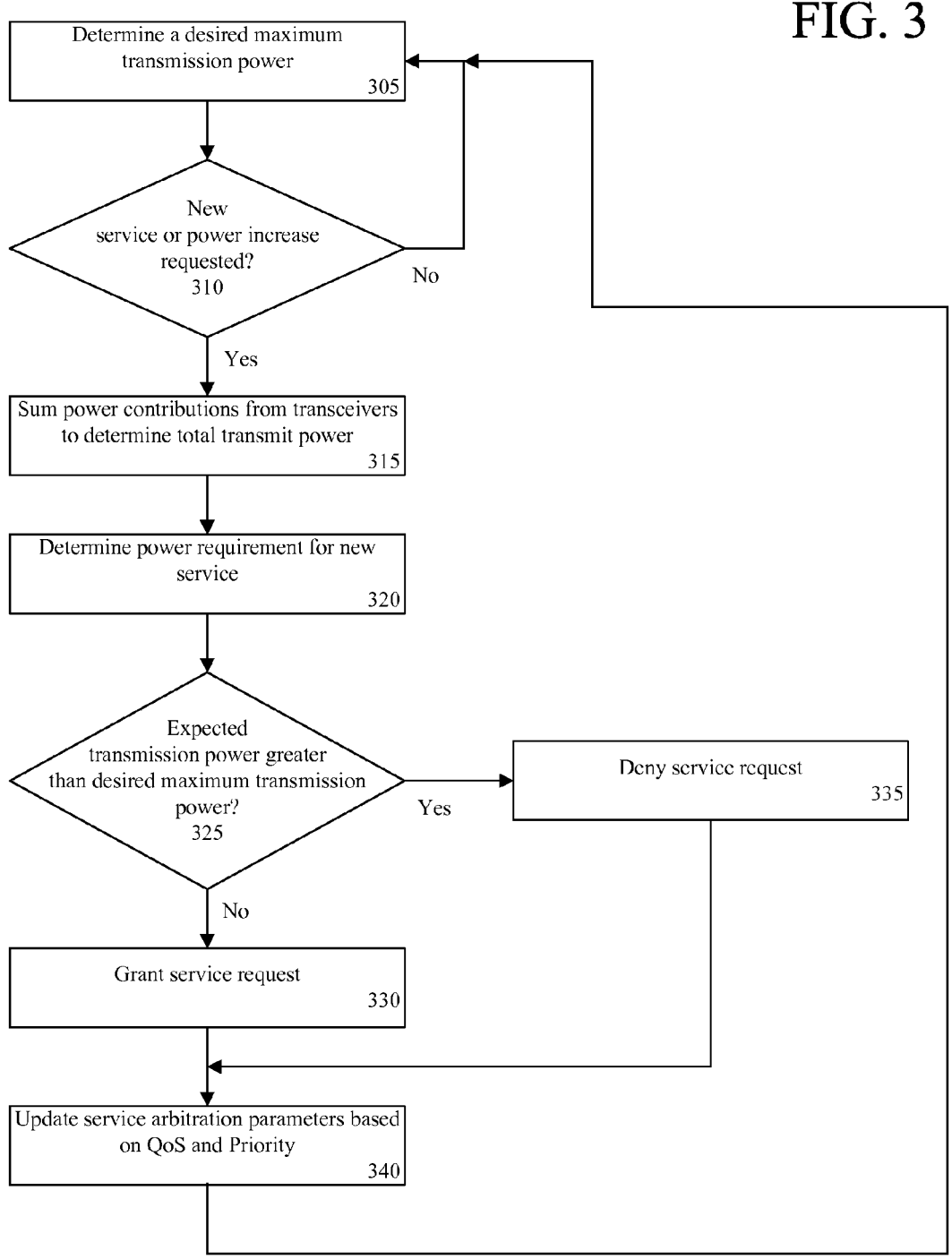
FIG. 3 is a flowchart presenting a method for determining whether to grant a service request that is useful for understanding the present invention.

FIG. 3 is a flowchart presenting a method 300 for determining whether to grant a service request, which is useful for understanding the present invention. Beginning at step 305, a desired maximum transmission power for the communication device can be determined Referring to decision box 310, the determination of the desired maximum transmission power can be performed periodically or the process can continually monitor the communication device to update the value of the desired maximum transmission power each time a change is detected in the communication device.

When a new service or an increase in transmit power (e.g. instantaneous transmit power) for an existing service is requested, at step 315 the power contribution for a transceiver or transceivers currently active on the communication device can be determined and totaled (e.g. summed together) to generate a total device transmission power. The current transmit power and current bit rates can be used to compute the expected transmission power.

Continuing to step 320, the power contribution factor for the requested service or power increase can be estimated and added to the current transmission power to generate an expected total transmission power that includes the requested service or power increase. Such estimation can be based on, for example, an estimated bit rate of the data stream that will be generated for the requested service. In another arrangement, the estimated power contribution can be calculated for a single symbol duration based on the number of active sub-carriers and the energy per bit for each transmitted symbol. This may vary as a function of the modulation and coding scheme (MCS) that is used.

In one arrangement, an initial bit rate can be used to determine the estimated power contribution factor. In another arrangement, the lowest bit rate that is suitable can be used for the estimation. In yet another arrangement, estimations of the power contribution factor can be performed using both the default bit rate and the lowest bit rate, and two total transmission power estimates can be generated. Of course, any number of such estimations can be performed for different bit rates of the requested service and the invention is not limited in this regard.

Referring to decision box 325, if the expected transmission power will not exceed the desired maximum transmission power when the requested service is implemented at the default bit rate, at step 330 the service request or power increase can be granted. An increase in the instantaneous transmit power can be achieved by increasing the energy per bit of the service data stream.

If, however, the expected transmission power will exceed the desired maximum transmission power when the requested service is implemented at the default bit rate, the process can proceed to step 335 and the service request can be denied. Proceeding to step 340, the service arbitration parameters can be updated based on the QoS and priority.

Figure 4:
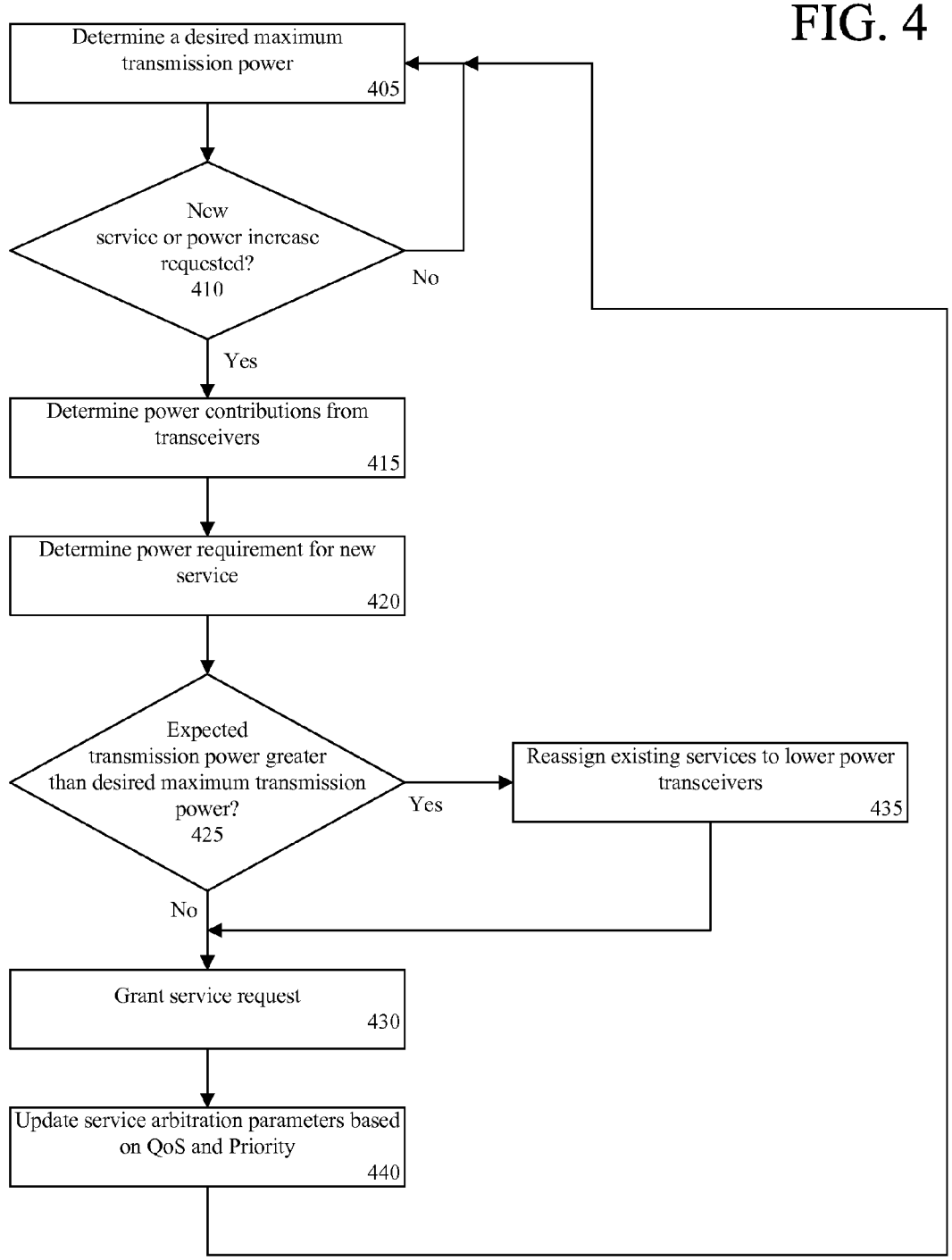
FIG. 4 is a flowchart presenting a method for reassigning service requests that is useful for understanding the present invention.

FIG. 4 is a flowchart presenting a method 400 for reassigning service requests that is useful for understanding the present invention. Beginning at step 405, a desired maximum transmission power for the communication device can be determined. Referring to decision box 410, the determination of the desired maximum transmission power can be performed periodically or the process can continually monitor the communication device to update the value of the desired maximum transmission power each time a change is detected in the communication device.

When a new service is requested or an increase in transmit power (e.g. instantaneous transmit power) of an existing service is requested, at step 415 the power contribution factors for all transceivers on the communication device can be totaled, or summed, to determine an expected transmission power. The current transmit power and current bit rates can be used to compute the expected transmission power.

At step 420, the power contribution factor for the requested service or power increase can be estimated and added to the current transmission power to generate an expected total transmission power that includes the requested service or power increase. Referring to decision box 425, if the expected total transmission power is not greater than the desired maximum transmission power, at step 430 the service request (or power increase) can be granted.

However, if the expected total transmission power is greater than the desired maximum transmission power, the process can proceed to step 435 and one or more active services can be assigned to a lower power transceiver, which can effectively reduce the power contribution factors for such services. For example, the energy per bit of service data streams can be decreased by re-assigning such services to lower power transceivers. Moreover, the power contribution factors for one or more transceivers can be further reduced by temporarily deactivating low priority services on such transceivers. The process then can proceed to step 430 and the service request or request for increase in instantaneous transmit power can be granted. Proceeding to step 440, the service arbitration parameters based on QoS and priority can be updated.

Figure 5:
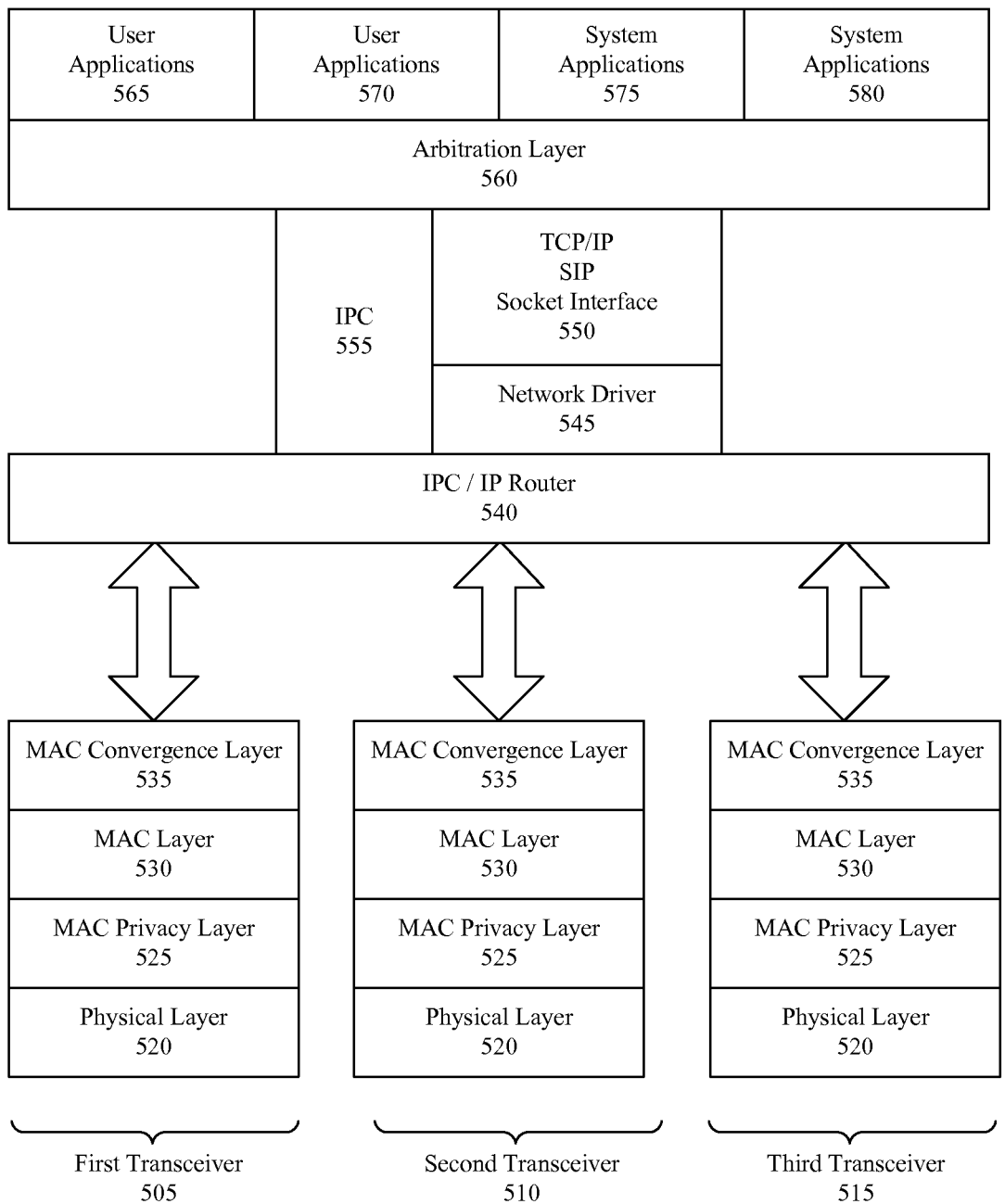
FIG. 5 depicts a protocol stack having a plurality of protocol layers that are useful for understanding the present invention.

FIG. 5 depicts a protocol stack 500 comprising a plurality of protocol layers that are useful for understanding the present invention. The protocol stack 500 represents protocol layers that can be implemented on a communication device implementing the processes described herein. The protocol stack 500 can include, for instance, a plurality of protocol layers that are implemented by modems within the communication device's transceivers, for example a first transceiver 505, a second transceiver 510 and a third transceiver 515. For each modem of the respective transceivers 505-515, such layers can include a physical layer 520, a media access control (MAC) privacy layer 525, a MAC layer 530 and a MAC convergence layer 535, each of which are well known to the skilled artisan. The protocol stack 500 also can include a plurality of protocol layers implemented by networking services. Such layers can include an internet protocol (IP) router 540, a network driver 545, and a TCP/IP stack/session initiation protocol (SIP) interface 550. An inter-processor communication (IPC) layer 555 also can be provided to manage inter-processor communications between the transceivers. Again such layers are well known to the skilled artisan.

The protocol stack 500 further can include an arbitration layer 560. The arbitration layer 560 can arbitrate usage of the protocol layers 520-555 by services associated with user applications 565, 570 and system applications 575, 580. For example, determination of desired maximum transmission power, monitoring of actual transmission power, and prioritization of services can be performed at the arbitration layer 560. Further, decisions whether to terminate use of specific transceivers or services, or to reduce their power contribution factors, and decisions whether to grant service requests also can be performed at the arbitration layer 560.

For example, assume the user application 570 is a web browsing application and the user application 565 is a call handling application. Also assume that the first transceiver 505 is a higher power transceiver than the second transceiver 510. Further assume that the web browsing application is currently active on the first transceiver 505 when a call is received. In response to the call handling application initiating a service request, the arbitration layer 560 can reassign the lower priority web browsing application to the second transceiver 510. To reassign the lower priority browsing application to the second transceiver 510, a communication session can be started on the transceiver 510 and the browsing application can be handed over to that communication session. Alternatively, the browsing application can be handed over to another existing communication session. The arbitration layer 560 then can grant the call handling application's service request and assign the call the first transceiver 505. A number of other functions also can be performed at the arbitration layer 560 and the invention is not limited in this regard.

Figure 6:
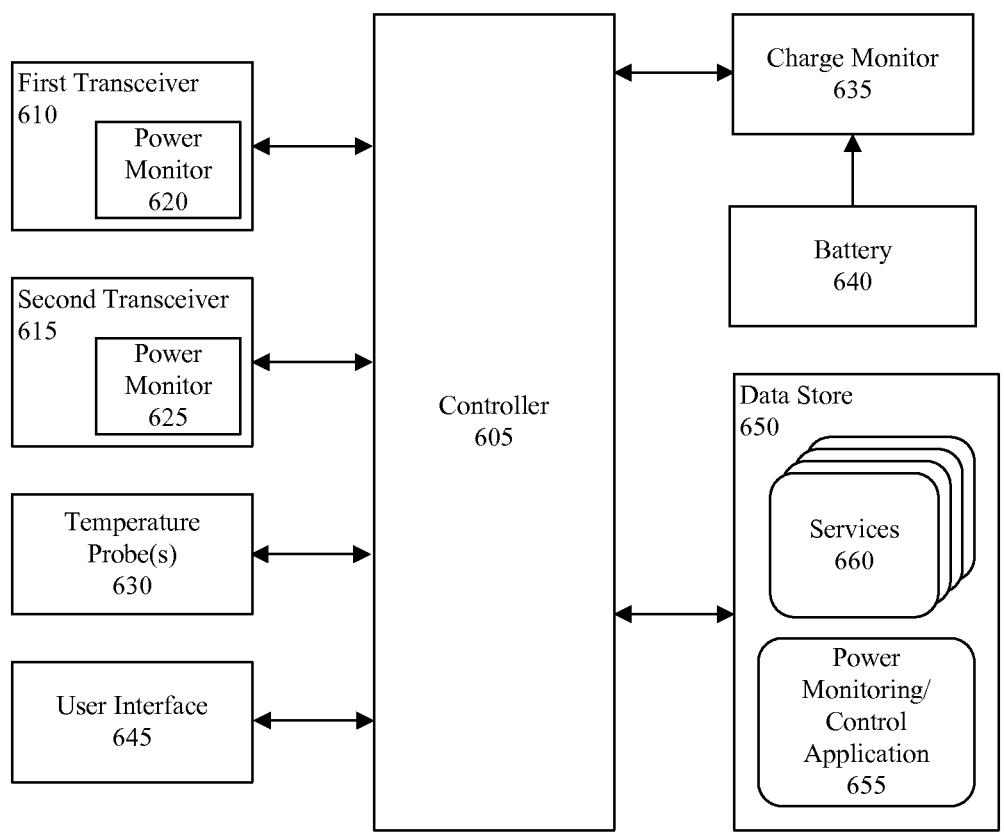
FIG. 6 depicts a block diagram of a communication device that is useful for understanding the present invention.

FIG. 6 depicts a block diagram of a communication device 600 that is useful for understanding the present invention. The communication device 600 can be a mobile communication device, such as a mobile computer, a personal digital assistant (PDA) or a mobile telephone, or any other electronic apparatus that can wirelessly communicate. The communication device 600 can include a controller 605. The controller 605 can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The communication device 600 also can include a first transceiver 610 and at least a second transceiver 615 that are used by the communication device 600 to communicate with one or more communications networks or other wireless communication devices. The transceivers 610, 615 can communicate data via IEEE 802 wireless communications, including 802.11 and 802.16 (WiMax), GSM, TDMA, CDMA, WCDMA, OFDM, direct wireless communication, TCP/IP, WPA, WPA2, or any other suitable form of wireless communications and/or communications protocols. Further, the transceivers 610, 615 can include respective power monitors 620, 625 that may be used to measure the transmission power output by the respective transceivers 610, 615. Power monitors are known to those skilled in the art.

In one arrangement, the communication device can include a plurality of controllers 605 or processors, and each of the controllers (or processors) can be associated with a particular transceiver 610, 615. Communications among the plurality of controllers can be controlled at the IPC layer previously discussed.

In operation, the transceiver 610 can receive control signals from the controller 605 which indicate to the transceiver 610 the transmit power that is to be applied for transmitting units of data contained in the various data streams, indicate the modulation scheme(s) to apply while transmitting the data streams, indicate the data rate(s) at which to transmit the data streams, and/or indicate any other parameters that can be applied by the transceiver 610. Similarly, the transceiver 610 can communicate signals to the controller 605 which indicate various transmission parameters that may be measured, for instance actual transmission power measured by the power monitor 620.

The communication device also can include one or more temperature probes 630. The temperature probes 630 can monitor the temperature of one or more components of the communication device 600. For example, the temperature probes 630 can monitor the temperature of the shell of the communication device, components of the first transceiver 610 and/or the second transceiver 615, or any other device components that may vary in temperature. Further, one or more of the temperature probes 630 also may monitor an ambient temperature (i.e. temperature of the environment where the communication device is operating). Temperature measurements from the temperature probes 630 can be communicated to the controller 605 as signals to be processed by one or more applications instantiated on the controller 605.

A charge monitor 635 also can be included in the communication device 600. The charge monitor 635 can monitor a charge of the communication device's battery 640, and communicate signals representing the level of charge remaining on the battery to the controller 605. Such signals also can be processed by one or more applications instantiated on the controller 605.

A user interface 645 can be provided on the communication device 600. The user interface 645 can include a keypad, buttons, a display, input and output audio transducers, biometric sensors, or any other devices which facilitate user interaction with the communication device 600. In an arrangement in which the communication device can be communicatively linked to external accessories, such as headsets or music systems, the user interface 645 also can include one or more suitable user interface adapters (not shown). Examples of such adapters can include a universal serial bus (USB) adapter, a wired user interface, a wireless user interface, such as a Bluetooth adapter or a ZigBee adapter, or any other suitable user interface adapters.

The communication device 600 also can include a data store 650. The data store 650 can include one or more storage devices, each of which can include a magnetic storage medium, an electronic storage medium, an optical storage medium, a magneto-optical storage medium, and/or any other storage medium suitable for storing digital information. In one arrangement, the data store 650 can be integrated into the controller 605.

A power monitoring/control application 655 can be contained on the data store 650. The power monitoring/control application 655 can be executed by the controller 605 to implement the methods and processes described herein. For example, the power monitoring/control application 655 can determine the desired maximum transmission power, receive signals from the transceiver's power monitors 620, 625 to monitor actual transmission power, receive signals from the charge monitor 635 to monitor battery charge level, and prioritize the transceivers 610, 615 and services 660. Further, decisions whether to terminate specific services 660, to reduce the power contribution factors of the services 660 and/or the transceivers 610, 615, and decisions whether to grant service requests also can be performed by the power monitoring/control application 655. As noted, one or more of such functions can be performed at the arbitration layer.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method for limiting transmission power of a communication device having a plurality of transceivers, comprising:
   determining a desired maximum transmission power;
   determining a plurality of power contribution factors, each of the power contribution factors associated with a respective one of the transceivers;
   determining an expected transmission power based on, at least in part, a sum of the power contribution factors;
   responsive to the expected transmission power exceeding the desired maximum transmission power, selectively reducing or terminating the power contribution for a first of the transceivers by re-assigning a first service currently active on the first transceiver to a second of the transceivers; and
   granting a new service request pursuant to reducing or terminating the power contribution for the first transceiver.

2. The method of claim 1, wherein selectively reducing the power contribution comprises reducing a bit rate of a data stream for the at least one of the transceivers.

3. The method of claim 1, wherein selectively reducing the power contribution comprises reducing a duty cycle of a data stream for the at least one of the transceivers.

4. The method of claim 1, wherein selectively terminating the power contribution comprises halting communication on at least one of the transceivers.

5. The method of claim 1, wherein selectively reducing or terminating the power contribution for the first transceiver comprises reallocating a service currently active on the first transceiver to the second of the transceivers.

6. A communication device, comprising:
   a plurality of transceivers;
   a storage device tangibly embodying a program of instructions; and
   a controller, configured to execute the program of instructions, that:
   determines a desired maximum transmission power;
   determines a plurality of power contribution factors, each of the power contribution factors associated with a respective one of the transceivers;
   determines an expected transmission power based on, at least in part, a sum of the power contribution factors;
   responsive to the expected transmission power exceeding the desired maximum transmission power, selectively reduces or terminates the power contribution for a first of the transceivers by re-assigning a first service currently active on the first transceiver to a second of the transceivers; and
   grants a new service request pursuant to reducing or terminating the power contribution for the first transceiver.

7. The communication device of claim 6, wherein the controller selectively reduces a bit rate of a data stream for the at least one of the transceivers in order to selectively reduce the power contribution.

8. The communication device of claim 6, wherein the controller selectively reduces a duty cycle of a data stream for the at least one of the transceivers in order to selectively reduce the power contribution.

9. The communication device of claim 6, wherein the controller receives a request for an increase in instantaneous transmit power of a service data stream being transmitted by the first transceiver and, responsive to the request, the controller reduces a bit rate of a service data stream being transmitted by the second of the transceivers and increases an energy per bit of the service data stream being transmitted by the first transceiver.

10. A program storage device readable by a machine, tangibly embodying a program of instructions executable by the machine to perform method steps for limiting transmission power of a communication device having a plurality of transceivers, said method steps comprising:
   determining a desired maximum transmission power;
   determining a plurality of power contribution factors, each of the power contribution factors associated with a respective one of the transceivers;
   determining an expected transmission power based on, at least in part, a sum of the power contribution factors;
   responsive to the expected transmission power exceeding the desired maximum transmission power, selectively reducing or terminating the power contribution for a first of the transceivers by re-assigning a first service currently active on the first transceiver to a second of the transceivers; and
   granting a new service request pursuant to reducing or terminating the power contribution for the first transceiver.

11. A method for limiting transmission power of a communication device having a plurality of transceivers, comprising:
   determining a desired maximum transmission power;
   determining a plurality of power contribution factors, each of the power contribution factors associated with a respective one of the transceivers;
   determining an expected transmission power based on, at least in part, a sum of the power contribution factors;
   responsive to the expected transmission power exceeding the desired maximum transmission power, selectively reducing or terminating the power contribution for a first of the transceivers; and
   responsive to receiving a request for an increase in instantaneous transmit power of a service data stream being transmitted by the first transceiver, reducing a bit rate of a service data stream being transmitted by a second of the transceivers and increasing an energy per bit of the service data stream being transmitted by the first transceiver.

12. A communication device, comprising:
   a plurality of transceivers;
   a storage device tangibly embodying a program of instructions; and
   a controller, configured to execute the program of instructions, that:
   determines a desired maximum transmission power;
   determines a plurality of power contribution factors, each of the power contribution factors associated with a respective one of the transceivers;
   determines an expected transmission power based on, at least in part, a sum of the power contribution factors;
   responsive to the expected transmission power exceeding the desired maximum transmission power, selectively reduces or terminates the power contribution for a first of the transceivers; and
   responsive to receiving a request for an increase in instantaneous transmit power of a service data stream being transmitted by the first transceiver, reduces a bit rate of a service data stream being transmitted by a second of the transceivers and increases an energy per bit of the service data stream being transmitted by the first transceiver.

13. A program storage device readable by a machine, tangibly embodying a program of instructions executable by the machine to perform method steps for limiting transmission power of a communication device having a plurality of transceivers, said method steps comprising:
   determining a desired maximum transmission power;
   determining a plurality of power contribution factors, each of the power contribution factors associated with a respective one of the transceivers;
   determining an expected transmission power based on, at least in part, a sum of the power contribution factors;
   responsive to the expected transmission power exceeding the desired maximum transmission power, selectively reducing or terminating the power contribution for a first of the transceivers; and
   responsive to receiving a request for an increase in instantaneous transmit power of a service data stream being transmitted by the first transceiver, reducing a bit rate of a service data stream being transmitted by a second of the transceivers and increasing an energy per bit of the service data stream being transmitted by the first transceiver.

* * * * *